(12) United States Patent
Elqadah et al.

(10) Patent No.: US 6,203,058 B1
(45) Date of Patent: Mar. 20, 2001

(54) INFLATABLE CURTAIN WITH TWO INFLATABLE MEMBERS

(75) Inventors: Wael S. Elqadah, Gilbert; Timothy A. Swann, Mesa, both of AZ (US); Bruce R. Hill, Bloomfield Hills, MI (US); Nathan R. Butters, Tempe; Aron Arnold, Phoenix, both of AZ (US)

(73) Assignees: TRW Inc.; TRW Vehicle Safety Systems Inc., both of Lyndhurst, OH (US); Simula Inc., Phoenix, AZ (US)

( * ) Notice: Subject to any disclaimer, the term of this patent is extended or adjusted under 35 U.S.C. 154(b) by 0 days.

(21) Appl. No.: 09/512,584

(22) Filed: Feb. 24, 2000

(51) Int. Cl.⁷ ..................................................... B60R 21/22
(52) U.S. Cl. .................. 280/730.2; 280/729; 280/743.1; 280/743.2; 280/749; 280/751; 280/753
(58) Field of Search .............................. 280/730.2, 743.2, 280/743.1, 729, 730.1, 749, 751, 753

(56) References Cited

U.S. PATENT DOCUMENTS

| | | |
|---|---|---|
| 3,687,485 | 8/1972 | Campbell et al. . |
| 5,265,903 | 11/1993 | Kuretake et al. . |
| 5,322,322 | 6/1994 | Bark et al. . |
| 5,333,898 | 8/1994 | Stutz . |
| 5,462,308 | 10/1995 | Seki et al. . |
| 5,588,672 | 12/1996 | Karolow et al. . |
| 5,660,414 | 8/1997 | Karolow et al. . |
| 5,707,075 | 1/1998 | Kraft et al. . |
| 5,788,270 | 8/1998 | Håland et al. . |
| 5,865,462 | 2/1999 | Robins et al. . |
| 6,010,149 * | 1/2000 | Riedel et al. ..................... 280/730.2 |

* cited by examiner

Primary Examiner—Eric Culbreth
(74) Attorney, Agent, or Firm—Tarolli, Sundheim, Covell, Tummino & Szabo L.L.P.

(57) ABSTRACT

Apparatus (10) for helping to protect an occupant of a vehicle (12) which has a side structure (16) and a roof (28) comprises an inflatable curtain (14). The curtain (14) is inflatable in a first direction away from the roof into a position between the side structure of the vehicle and a vehicle occupant. The inflatable curtain (14) when inflated extends fore and aft in the vehicle (12) along the side structure (16) of the vehicle. First and second inflatable members (52 and 54) connect the inflatable curtain (14) to the vehicle (12). An inflation fluid source (24) provides inflation fluid for inflating the inflatable curtain (14) and the first and second inflatable members (52 and 54). The first and second inflatable members (52 and 54) are inflatable to resist movement of the inflatable curtain (14) away from the side structure (16) of the vehicle (12) when the inflatable curtain is inflated.

17 Claims, 2 Drawing Sheets

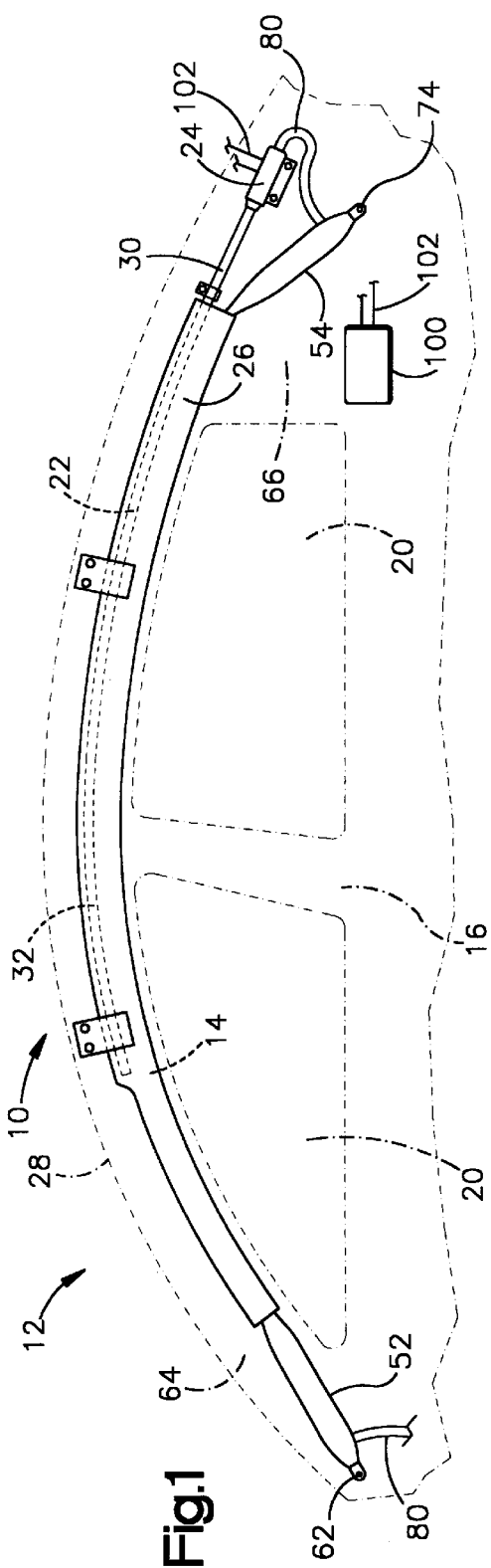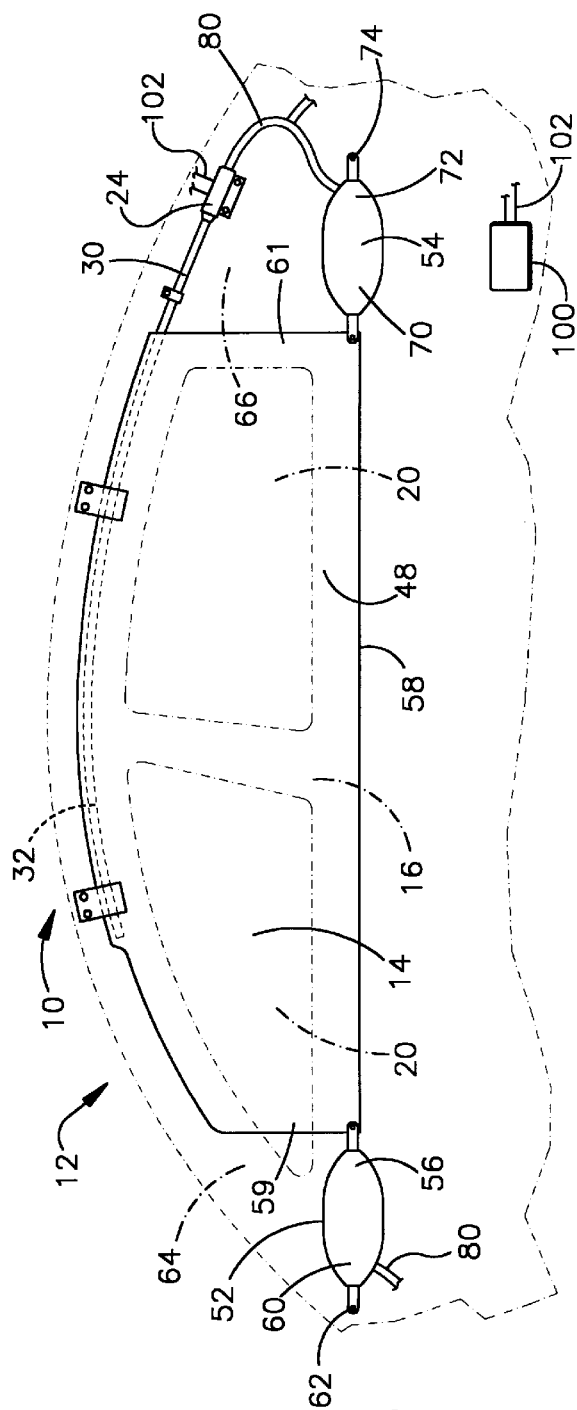

INFLATABLE CURTAIN WITH TWO INFLATABLE MEMBERS

FIELD OF THE INVENTION

The present invention relates to an inflatable vehicle safety apparatus for helping to protect a vehicle occupant in the event of a side impact to a vehicle and/or a vehicle rollover.

BACKGROUND OF THE INVENTION

It is known to inflate a vehicle safety apparatus to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle which has a side structure and a roof. The apparatus includes an inflatable curtain which is inflatable away from the roof into a position between the side structure of the vehicle and a vehicle occupant. The inflatable curtain, when inflated, extends fore and aft in the vehicle along the side structure of the vehicle. First and second inflatable members connect the inflatable curtain to the vehicle. An inflation fluid source provides inflation fluid for inflating the inflatable curtain and the first and second inflatable members. The first and second inflatable members are inflatable to resist movement of the inflatable curtain away from the side structure of the vehicle when the inflatable curtain is inflated.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable vehicle safety apparatus in accordance with a first embodiment of the present invention illustrating the safety apparatus in a deflated condition;

FIG. 2 is a schematic view of the vehicle safety apparatus of FIG. 1 in an inflated condition.

DESCRIPTION OF PREFERRED EMBODIMENTS

Figure 3:
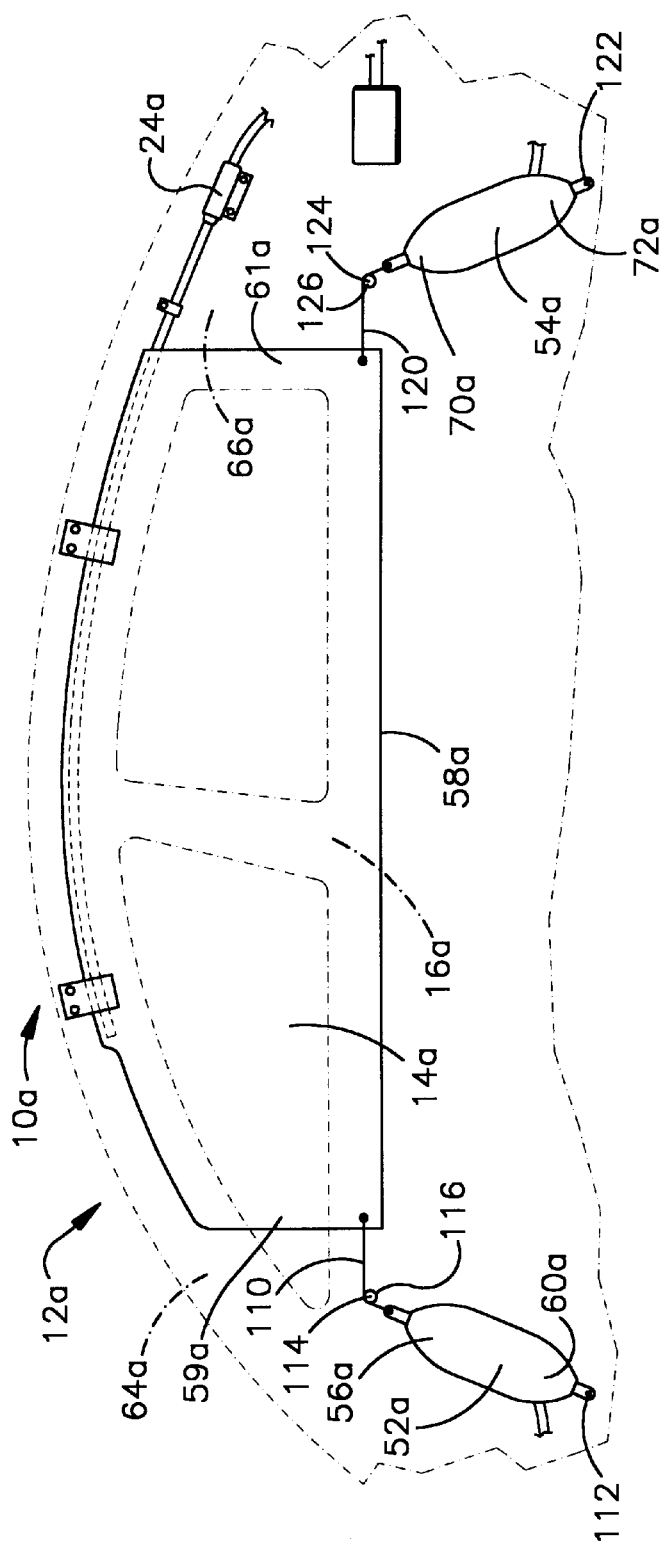
FIG. 3 is a schematic view of a vehicle safety apparatus in accordance with a second embodiment of the present invention.

As representative of the present invention, a vehicle safety apparatus 10 helps to protect an occupant of a vehicle. As shown in FIGS. 1 and 2, the safety apparatus 10 includes an inflatable curtain 14, which is mounted adjacent to the side structure 16 of the vehicle 12. The side structure 16 of the vehicle 12 includes side windows 20. An inflator 24 is connected in fluid communication with the inflatable curtain 14 through a first fill tube 22.

The first fill tube 22 has a first end portion 30 for receiving fluid from the inflator 24. The first fill tube 22 has a second end portion 32 which is disposed in the inflatable curtain 14 (FIG. 2). The second end portion 32 of the first fill tube 22 has a plurality of openings (not shown) that provide fluid communication between the first fill tube 22 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid.

The safety apparatus 10 includes a housing 26 (FIG. 1) that stores the inflatable curtain 14 in a deflated condition. The first fill tube 22, the deflated inflatable curtain 14, and housing 26 have an elongated configuration and extend along the vehicle roof 28 and along the side structure 16 of the vehicle 12 above the side windows 20.

The inflatable curtain 14 (FIG. 2) is formed from a sheet of material that is folded over to form an outer panel (not shown) and an overlying inner panel 48. The outer panel and inner panel 48 are secured to each other along the perimeter of the inflatable curtain 14 by known means such as stitching or an adhesive (not shown). When the inflatable curtain 14 is in the inflated condition, the outer panel is positioned adjacent the side structure 16 of the vehicle 12. It should be understood, however, that alternative constructions could be incorporated into the design of the inflatable curtain 14 without negatively affecting its functionality.

The safety apparatus 10 includes first and second inflatable members 52 and 54 which have a generally tubular shape. A first end 56 of the first inflatable member 52 is connected to the inflatable curtain 14 at a location adjacent to a bottom edge 58 and a forward edge 59 of the inflated curtain 14. A second end 60 of the first inflatable member 52, opposite the first end 56, is connected to the side structure 16 of the vehicle 12 at a first location 62. The first location 62 is positioned forward of the forward edge 59 of the inflatable curtain 14 as viewed relative to the direction of forward travel of the vehicle 12. The first location 62 may be on or near an A pillar 64 of the vehicle 12.

A first end 70 of the second inflatable member 54 is connected to the inflatable curtain 14 at a location adjacent to the bottom edge 58 and a rear edge 61 of the inflated curtain 14. A second end 72 of the second inflatable member 54, opposite the first end 70, is connected to the side structure 16 of the vehicle 12 at a second location 74. The second location 74 is positioned rearward of the rear edge 61 of the inflatable curtain 14 as viewed relative to the direction of forward travel of the vehicle 12. The second location 74 may be located on or near a C pillar 66 of the vehicle 12.

The first and second inflatable members 52 and 54 are connected in fluid communication with the inflator 24 by a second fill tube 80. The second fill tube 80 consists of a flexible conduit, such as a hose. In the illustrated embodiment, the inflator 24 serves as a common source for providing inflation fluid to both the inflatable curtain 14 and the first and second inflatable members 52 and 54. It will be recognized by those skilled in the art, however, that separate inflators may be used to provide inflation fluid to the inflatable curtain 14 and the inflatable members 52 and 54.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 100 provides an electrical signal over lead wires 102 to the inflator 24. The electrical signal causes the inflator 24 to be actuated in a known manner. The inflator 24 discharges fluid under pressure into the first and second fill tubes 22 and 80. The first fill tube 22 directs the fluid into the inflatable curtain 14. The second fill tube 80 directs inflation fluid into the first and second inflatable members 52 and 54 (FIG. 2).

The inflatable curtain 14 and the first and second inflatable members 52 and 54 inflate under the pressure of the inflation fluid from the inflator 24. The inflatable curtain 14 and the inflatable members 52 and 54 may begin inflating simultaneously or the inflatable members 52 and 54 may begin inflating after the inflatable curtain 14 begins inflating. The housing 26 (FIG. 1) opens and the inflatable curtain 14 (FIG. 2) inflates away from the roof 28 in a downward direction as shown in the drawings and in a downward direction with respect to the direction of forward travel of the vehicle 12. The first and second inflatable members 52 and 54 move downward with the inflatable curtain 14 into the position illustrated in FIG. 2.

The inflatable curtain 14, when inflated, extends fore and aft in the vehicle 12 along the side structure 16 and is positioned between the side structure 16 of the vehicle 12 and any occupant of the vehicle. The inflatable curtain 14, when inflated, helps to protect a vehicle occupant in the event of a vehicle rollover or a side impact to the vehicle 12.

In the uninflated condition (not shown), the first and second inflatable members 52 and 54 each have a given length and a given diameter. Upon inflation, the respective diameters of the first and second inflatable members 52 and 54 increase, and the respective lengths of the inflatable members 52 and 54 decrease. Thus, when inflated, the first and second inflatable members 52 and 54 apply a tension to the inflatable curtain 14 between the first and second locations 62 and 74. The first and second inflatable members 52 and 54 thereby resist movement of the inflatable curtain 14 away from the side structure 16 of the vehicle 12 when the curtain 14 is inflated.

It may be desirable to apply a tension to the inflatable curtain 14 in the downward direction in which the curtain 14 is inflated. In this instance, the first and second locations 62 and 74 may be positioned below the bottom edge 58 of the inflated inflatable curtain 14. The first and second inflatable members 52 and 54, when inflated, will then tension the inflatable curtain 14 in a downward direction, as well as in a forward and rearward direction, in the vehicle as shown in the drawings and with respect to the direction of forward travel of the vehicle 12.

A second embodiment of the present invention is illustrated in FIG. 3. The second embodiment of the invention is similar to the first embodiment of the invention illustrated in FIGS. 1 and 2. Accordingly, numerals similar to those of FIGS. 1 and 2 will be utilized in FIG. 3 to identify similar components, the suffix letter "a" being associated with the numerals of FIG. 3 to avoid confusion.

The safety apparatus 10a (FIG. 3) of the second embodiment is identical to the safety apparatus 10 (FIGS. 1 and 2), except that the arrangement of the inflatable members 52a and 54a (FIG. 3) differs from the arrangement of the inflatable members 52 and 54 (FIGS. 1 and 2). Specifically, the first end 56a of the first inflatable member 52a is connected to the inflatable curtain 14a by a first flexible elongated member 110, such as a cable. The second end 60a of the first inflatable member 52a is connected to the side structure 16a of the vehicle 12a at a first location 112. The first location 112 is positioned forward of the forward edge 59a of the inflatable curtain 14a as viewed relative to the direction of forward travel of the vehicle 12a. The first location 112 may be on or near the A pillar 64a of the vehicle 12a.

A first pulley 114 is connected to the side structure 16a of the vehicle 12a at a third location 116 on or near the A pillar 64a of the vehicle 12a. The third location 116 is positioned forward of the forward edge 59a of the inflatable curtain 14a and between the first end 56a of the first inflatable member 52a and the inflatable curtain 14a. The first pulley 114 guides the first flexible elongated member 110 from the first end 56a of the first inflatable member 52a to the inflatable curtain 14a.

The first end 70a of the second inflatable member 54a is connected to the inflatable curtain 14a by a second flexible elongated member 120. The second end 72a of the second inflatable member 54a is connected to the side structure 16a of the vehicle 12a at a second location 122. The second location 122 is positioned rearward of the rear edge 61a of the inflatable curtain 14a as viewed relative to the direction of forward travel of the vehicle 12a. The second location 122 may be on or near the C pillar 66a of the vehicle 12a.

A second pulley 124 is connected to the side structure 16a of the vehicle 12a at a fourth location 126 on or near the C pillar 66a of the vehicle 12a. The fourth location 126 is positioned rearward of the rear edge 61a of the inflatable curtain 14a and between the first end 70a of the second inflatable member 54a and the inflatable curtain 14a. The second pulley 124 guides the second flexible elongated member 120 from the first end 70a of the second inflatable member 54a to the inflatable curtain 14a.

When the inflatable curtain 14a is inflated, the respective diameters of the first and second inflatable members 52a and 54a increase, and the respective lengths of the members 52a and 54a decrease. Thus, when inflated, the first and second inflatable members 52a and 54a apply a tension to the inflatable curtain 14a between the third and fourth locations 116 and 126 via the first and second flexible elongated members 110 and 120. The first and second inflatable members 52a and 54a thereby resist movement of the inflatable curtain 14a away from the side structure 16a of the vehicle 12a when the curtain 14a is inflated.

It may be desirable to apply a tension to the inflatable curtain 14a in the downward direction in which the curtain 14a is inflated. In this instance, the third and fourth locations 116 and 126 may be adjusted such that the first and second pulleys 114 and 124 are positioned below the bottom edge 58a of the inflated inflatable curtain 14a. The first and second inflatable members 52a and 54a will then tension the inflatable curtain 14a in a downward direction, as well as in a forward and rearward direction, in the vehicle as shown in the drawings and with respect to the direction of forward travel of the vehicle 12a.

The first and second inflatable members 52a and 54a may be located on the side structure 16a of the vehicle 12a in any desired position relative to a vehicle occupant. For example, when inflated, the first and second inflatable members 52a and 54a may be located between the side structure 16a of the vehicle 12a and a vehicle occupant. As a result, the first and second inflatable members 52a and 54a may help to protect the vehicle occupant in the event of a vehicle rollover or a side impact to the vehicle 12a.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle which has a side structure and a roof, said apparatus comprising:

an inflatable curtain which is inflatable in a first direction away from the vehicle roof into a position between the side structure of the vehicle and a vehicle occupant, said inflatable curtain when inflating extending fore and aft in the vehicle along the side structure of the vehicle;

first and second inflatable members which connect said inflatable curtain to the vehicle; and an inflation fluid source which provides inflation fluid for inflating said inflatable curtain and said first and second inflatable members;

said first and second inflatable members being inflatable to resist movement of said inflatable curtain away from the side structure of the vehicle when said inflatable curtain is inflated, said first and second inflatable members being generally tubular in shape and each having a given diameter and a given length when uninflated, said first inflatable member having a first end and an opposite second end, said first end being connected to said inflatable curtain at a location adjacent to a bottom edge and a forward edge of said inflatable curtain, said second end being connected to the vehicle at a first location, said second inflatable member also having a first end and an opposite second end, said first end of said second inflatable member being connected to said inflatable curtain at a location adjacent to said bottom edge and a rear edge of said inflatable curtain, said second edge of said second inflatable member being connected to the vehicle at a second location, said diameters of said first and second inflatable members increase and said lengths of said first and second inflatable members decrease when said first and second inflatable members when inflated resisting movement of said inflatable curtain away from the side structure of the vehicle, a first flexible elongated member connecting said first end of said first inflatable member to said inflatable curtain;

a first pulley connected to the vehicle at a third location, said first flexible elongated member being guided by said first pulley from said first end of said first inflatable member to said inflatable curtain;

a second flexible elongated member connecting said first end of said second inflatable member to said inflatable curtain; and a second pulley connected to the vehicle at a fourth location, said second flexible elongated member being guided by said second pulley form said first end of said second inflatable member to said inflatable curtain.

2. Apparatus as defined in claim 1, wherein said first and second inflatable members when inflated tension said inflatable curtain between said third and fourth locations.

3. Apparatus as defined in claim 1, wherein said first inflatable member is inflated into a position between the side structure of the vehicle and the vehicle occupant.

4. Apparatus as defined in claim 1, wherein said second inflatable member is inflated into a position between the side structure of the vehicle and the vehicle occupant.

5. Apparatus as defined in claim 1 wherein said third location is positioned forward of said forward edge of said inflatable curtain and between said inflatable curtain and said first inflatable member.

6. Apparatus as defined in claim 1 wherein said fourth location is positioned rearward of said rear edge of said inflatable curtain and between said inflatable curtain and said second inflatable member.

7. Apparatus as defined in claim 1 wherein said third location is on an A pillar of the vehicle.

8. Apparatus as defined in claim 1 wherein said fourth location is on a C pillar of the vehicle.

9. Apparatus for helping to protect an occupant of a vehicle which has a side structure and a roof, said apparatus comprising:

an inflatable curtain which is inflatable in a first direction away from the vehicle roof into a position between the side structure of the vehicle and a vehicle occupant, said inflatable curtain when inflating extending fore and aft in the vehicle along the side structure of the vehicle;

first and second inflatable members which connect said inflatable curtain to the vehicle; and an inflation fluid source which provides inflation fluid for inflating said inflatable curtain and said first and second inflatable members;

said first and second inflatable members being inflatable to resist movement of said inflatable curtain away from the side structure of the vehicle when said inflatable curtain is inflated, and a first fill tube having a portion located in said inflatable curtain, said inflation fluid source being in fluid communication with said first fill tube, said inflation fluid source, when actuated, providing inflation fluid to said first fill tube, said first fill tube directing said inflation fluid into said inflatable curtain to inflate said inflatable curtain, and a second fill tube connected to said first and second inflatable members, said inflation fluid source being in fluid communication with said second fill tube, said inflation fluid source, when actuated, providing inflation fluid to said second fill tube, said second fill tube directing said inflation fluid into said first and second inflatable members to inflate said first and second inflatable members, said first and second inflatable members being sealed members except for an opening for said second fill tube and being generally tubular in shape and each having a diameter and a given length when uninflated, said first inflatable member having a first end and an opposite second end, said first end being connected to said inflatable curtain at a location adjacent to a bottom edge and a forward edge of said inflatable curtain, said second end being connected to the vehicle at a first location, said second inflatable member also having a first end and an opposite second end, said first end of said second inflatable member being connected to said inflatable curtain at a location adjacent to said bottom edge and a rear edge of said inflatable curtain, said second end of said second inflatable member being connected to the vehicle at a second location, said opening for said second fill tube on each of said first and second inflatable members being at a location other than said first and second locations.

10. Apparatus as defined in claim 9, wherein said inflatable curtain and said first and second inflatable members have a stored position extending along the side structure adjacent to the roof of the vehicle.

11. Apparatus as defined in claim 9, wherein said diameters of said first and second inflatable members increase and said lengths of said first and second inflatable members decrease when said first and second inflatable members are inflated, said first and second inflatable members when inflated resisting movement of said inflatable curtain away from the side structure of the vehicle.

12. Apparatus as defined in claim 11, wherein said first and second inflatable members when inflated tension said inflatable curtain between said first and second locations.

13. Apparatus as defined in claim 9 wherein said first location is positioned forward of said forward edge of said inflatable curtain and said second location is located rearward of said rear edge of said inflatable curtain.

14. Apparatus as defined in claim 9 wherein said first location is on an A pillar of the vehicle.

15. Apparatus as defined in claim 9 wherein said second location is on a C pillar of the vehicle.

16. Apparatus as defined in claim 9, further including a sensor for sensing a vehicle condition for which inflation of said inflatable curtain is desired, said sensor actuating said source to provide inflation fluid to said inflatable members.

17. Apparatus as defined in claim 9, wherein said source comprises an inflator which is actuatable to inflate said inflatable curtain and said inflatable members.

* * * * *